UNITED STATES PATENT OFFICE.

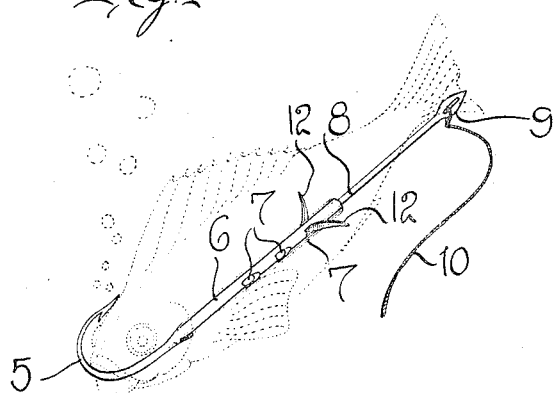

STEPHEN T. BONNER, OF SPOKANE, WASHINGTON.

FISH-HOOK.

1,152,698.  Specification of Letters Patent.  Patented Sept. 7, 1915.

Application filed December 12, 1914. Serial No. 876,895.

*To all whom it may concern:*

Be it known that I, STEPHEN T. BONNER, a citizen of the United States, residing at Spokane, in the county of Spokane and State of Washington, have invented certain new and useful Improvements in Fish-Hooks, of which the following is a specification, reference being had to the accompanying drawings.

This invention relates to improvements in fish hooks and has for its primary object to provide an improved device of this character primarily for use in troll fishing whereby the minnow or other bait will be securely held upon the hook against displacement or release therefrom when the line is cast.

The invention has for an additional object to provide a fish hook which is so constructed that the minnow may be very easily and quickly engaged thereon with a minimum laceration or tearing of the flesh of the fish.

In the accomplishment of the objects above stated, I employ a hook having a tubular shank provided with series of opposed openings in its walls, and a rod to which the line is connected loosely engaged in said tubular shank and provided with expansible resilient flukes or prongs adapted to project through the opposed openings and penetrate the body of the minnow or other bait.

It is a further general object of my invention to improve and simplify the construction of devices of the above character whereby their convenience and serviceability as well as the efficiency of the same in practical use, is greatly increased.

With the above and other objects in view, my invention consists in the novel features of construction, combination, and arrangement of parts to be hereinafter more fully described, claimed, and illustrated in the accompanying drawing, in which, Figure 1 is a perspective view of my improved fish hook, showing a minnow or other bait in dotted lines; Fig. 2 is an elevation illustrating the condition of the device when the bait is to be applied thereto; Fig. 3 is a longitudinal section; and Fig. 4 is a detail perspective view of the adjustable impaling member.

Referring in detail to the drawing, 5 designates a fish hook which is provided with an elongated tubular shank 6 closed at one end. It will be understood, that though I have illustrated an integral construction of the shank and hook, the shank may, nevertheless, be provided upon its outer end with desired number of detachable hooks. This type of fish hook is so well known in the art, that its illustration or further description would be superfluous. The tubular shank 6 is provided in its walls with opposed series of openings indicated at 7, the particular purpose of which will be hereinafter fully pointed out.

The numeral 8 designates what I shall hereinafter refer to as the impaling member. This member consists of a rod having an eye or loop 9 formed upon one end whereby the fish line shown at 10 may be conveniently connected thereto. The eye 9 is preferably of elongated form and tapers to a point whereby the insertion of the rod 8 through the body of the minnow is facilitated. The other end of this rod is formed with a slightly enlarged head 11 upon which, at opposite sides of the rod, the resilient flukes or prongs 12 are integrally formed. These prongs extend inwardly from the head 11 and gradually diverge or extend outwardly from the rod. The head 11 is of such diameter that it will freely move longitudinally within the bore of the tubular shank 6.

In the use of the device, the rod of the impaling member is forced inwardly into the shank 6 until the resilient prongs 12 are disposed in the inner end of the bore of said shank and beyond the series of openings 7. In this position of the impaling member, the same is inserted into the mouth of the minnow or other bait, as shown in Fig. 2 and forced through the body thereof. After the shank 5 has been projected through the body of the minnow, and the hook 6 disposed adjacent to the mouth of the minnow, the end of the impaling member is grasped and pulled outwardly. This member is then turned in the tubular shank 5 so that the resilient prongs 12 thereof are opposed to the openings 7 in the shank and will project outwardly therethrough. These prongs are of sufficient length to extend through the body of the minnow as clearly indicated in Fig. 1. In the casting of the line, it will be obvious that the weight of the minnow or other bait tends to pull the tubular shank of the hook outwardly upon the impaling member, and thus prevent the prongs of said member from working out of the body of the minnow so as to release the latter. These prongs effectually prevent any turning movement of the minnow upon the hook shank and effectually obviate tearing of the body of the minnow in its efforts to escape. In troll fishing, it is desirable that the minnow or other bait be held straight as it is drawn through the water and prevented from turning with relation to the hook. This object is fully attained by means of my improved fish hook above described.

It will be apparent that, after the fish has been impaled by the hook 5, it cannot escape by twisting and turning the shank 6 upon the rod 8, in the event that the prongs 12 are displaced, owing to the fact that the inner end of said shank is closed and the enlarged end 11 of the rod 8 would effectually preclude the complete separation of said rod and the shank 6.

From the foregoing description, taken in connection with the accompanying drawing, the construction, manner of use, and several advantages of the invention will be clearly and fully understood. The bait may be very easily and quickly engaged upon the hook. It is to be particularly noted that the body of the minnow is not greatly mutilated, as the impaling members 12 extend through the body adjacent to the tail. Thus, the minnow will remain alive for a long time. It is, therefore, manifest that very gratifying results may be obtained in the use of the present invention. It is further apparent that as the fish hook is extremely simple in its construction, the same may be produced at small manufacturing cost, and is highly durable and serviceable in use. The hooks may be furnished to the retail trade by the manufacturer in various sizes or grades as are used for catching different species of fish. It is, therefore, to be understood that while I have illustrated in the drawing a very practical embodiment of my invention, the several elements thereof may be greatly varied in form, proportion and arrangement, and I, therefore, reserve the privilege of resorting to all such legitimate changes as may be fairly embodied within the spirit and scope of the invention as claimed.

Having thus fully described my invention, what I desire to claim and secure by Letters Patent is:—

1. A fish hook including the hook proper having a shank, and an impaling member longitudinally movable with respect to said shank and provided with a prong adapted to engage the shank and be forced outwardly when the impaling member is moved in one direction and projected into a bait engaged upon said shank.

2. A fish hook including the hook proper having a shank, and an impaling member having spaced prongs adapted to engage said shank when said member is moved in one direction and be forced outwardly from the shank and into the body of a bait engaged thereon.

3. A fish hook including the hook proper having a shank, and an impaling member having spaced resilient prongs adapted to engage said shank when said member is moved in one direction and be forced outwardly from the shank and into the body of a bait engaged thereon.

4. A fish hook including the hook proper having a shank, and an impaling member having spaced resilient prongs integrally formed with said member adapted to engage said shank when said member is moved in one direction and be forced outwardly from the shank and into the body of a bait engaged thereon.

5. A fish hook including a tubular shank having the hook proper on one end, said shank being provided with opposed openings, and an impaling member movably engaged in said shank and having spaced prongs adapted to engage the wall of the shank in the movement of said member in one direction and project outwardly through said openings into the body of a bait engaged on the shank.

6. A fish hook including a tubular shank having the hook proper on one end, said shank being provided with a series of openings in its wall, and an impaling member longitudinally movable within said shank and having a resilient prong adapted to project outwardly through said opening when the member is moved in one direction and penetrate the body of a bait engaged on said shank.

7. A fish hook including a tubular shank provided with the hook proper on one end, said shank having opposed series of openings in its wall, and an impaling member longitudinally movable in said shank and provided with oppositely projecting resilient prongs engaged with the walls of the shank and adapted to project outwardly through opposed openings therein when said member is moved in one direction and penetrates the body of a bait arranged on said shank.

8. A fish hook including a tubular shank having the hook proper on one end, said shank being provided with opposed series of openings in its wall, a rod longitudinally movable in said shank, and spaced resilient prongs fixed to one end of said rod and extending inwardly, said prongs being normally wholly confined within said tubular shank, said rod being adapted to be turned to aline the prongs with the openings in the shank whereby the prongs may be projected outwardly through opposed openings in the shank when said rod is moved in one direction and caused to penetrate the body of a bait engaged on said shank.

9. A fish hook including a tubular shank provided with a hook on one end and closed at its other end, a rod longitudinally movable in said shank, and means on said rod engaging the walls of the tubular shank to prevent relative turning movement of said rod and shank and also prevent longitudinal movement of the shank upon said rod in one direction.

10. A fish hook including a tubular shank having a hook on one end and closed at its other end, said shank being provided with opposed openings, and a rod longitudinally movable in said shank and provided with impaling prongs adapted by their inherent resiliency to project through the openings in the shank when in alinement therewith, said prongs when out of alined relation with said openings and disposed within the tubular shank being adapted to engage the closed end of said shank and prevent disconnection of said rod and shank.

In testimony whereof I hereunto affix my signature in the presence of two witnesses.

STEPHEN T. BONNER.

Witnesses:
G. J. BOWMAN,
CARL COX.